United States Patent
Mosaki et al.

(10) Patent No.: US 10,287,382 B2
(45) Date of Patent: May 14, 2019

(54) NITRILE RUBBER COMPOSITION AND CROSS-LINKED RUBBER

(71) Applicant: ZEON CORPORATION, Tokyo (JP)

(72) Inventors: Shiho Mosaki, Tokyo (JP); Sayaka Inoue, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/556,900

(22) PCT Filed: Mar. 11, 2016

(86) PCT No.: PCT/JP2016/057743
§ 371 (c)(1),
(2) Date: Sep. 8, 2017

(87) PCT Pub. No.: WO2016/148055
PCT Pub. Date: Sep. 22, 2016

(65) Prior Publication Data
US 2018/0030190 A1 Feb. 1, 2018

(30) Foreign Application Priority Data
Mar. 13, 2015 (JP) ................. 2015-050548

(51) Int. Cl.
| | |
|---|---|
| C08L 13/00 | (2006.01) |
| C08F 236/14 | (2006.01) |
| C08F 236/12 | (2006.01) |
| C08K 3/36 | (2006.01) |
| C08K 5/17 | (2006.01) |
| C08L 9/02 | (2006.01) |
| C08K 3/34 | (2006.01) |
| C08K 5/5435 | (2006.01) |

(52) U.S. Cl.
CPC .......... *C08F 236/14* (2013.01); *C08F 236/12* (2013.01); *C08K 3/34* (2013.01); *C08K 3/346* (2013.01); *C08K 3/36* (2013.01); *C08K 5/17* (2013.01); *C08K 5/5435* (2013.01); *C08L 9/02* (2013.01); *C08L 13/00* (2013.01)

(58) Field of Classification Search
CPC ........ C08F 236/14; C08F 236/12; C08K 3/34; C08K 3/36; C08K 3/17; C08K 5/17; C08L 9/02; C08L 13/00
See application file for complete search history.

(56) References Cited

U.S. PATENT DOCUMENTS

| | | | |
|---|---|---|---|
| 8,153,712 B2* | 4/2012 | Nagamori | C08K 5/005 524/186 |
| 8,362,121 B2* | 1/2013 | Nagamori | C08K 5/005 524/145 |
| 8,742,006 B2* | 6/2014 | Nagamori | C08K 3/36 524/556 |
| 8,786,530 B2* | 7/2014 | Tamaki | G09G 3/3648 345/212 |
| 9,932,434 B2* | 4/2018 | Inoue | C08F 236/12 |
| 9,969,886 B2* | 5/2018 | Inoue | C09K 3/14 |
| 2009/0062445 A1 | 3/2009 | Moritani | |
| 2009/0186977 A1 | 7/2009 | Nagamori et al. | |
| 2010/0168302 A1 | 7/2010 | Nagamori et al. | |
| 2011/0301300 A1 | 12/2011 | Iizuka | |
| 2012/0172509 A1 | 7/2012 | Nagamori et al. | |
| 2013/0102725 A1 | 4/2013 | Nagamori et al. | |
| 2013/0280459 A1 | 10/2013 | Nakashima et al. | |
| 2014/0296404 A1 | 10/2014 | Nagamori et al. | |
| 2016/0297955 A1* | 10/2016 | Inoue | C08L 13/00 |
| 2017/0015773 A1* | 1/2017 | Inoue | C08C 19/02 |
| 2017/0058100 A1* | 3/2017 | Nakashima | C08K 5/098 |
| 2017/0088700 A1* | 3/2017 | Nakashima | B29C 41/14 |
| 2017/0327672 A1* | 11/2017 | Inoue | C08K 5/0025 |
| 2018/0057628 A1* | 3/2018 | Mosaki | C08F 236/12 |
| 2018/0194924 A1* | 7/2018 | Mosaki | C08F 236/12 |

FOREIGN PATENT DOCUMENTS

| | | |
|---|---|---|
| EP | 1 964 882 A1 | 9/2008 |
| EP | 2 009 050 A1 | 12/2008 |
| EP | 2 671 914 A1 | 12/2013 |
| JP | 2003-120824 A | 4/2003 |
| JP | 2003-313539 A | 11/2003 |
| JP | 2011-037935 A | 2/2011 |
| WO | 2007/094158 A1 | 8/2007 |
| WO | 2010/038720 A1 | 4/2010 |
| WO | 2010/087431 A1 | 8/2010 |
| WO | 2012/090941 A1 | 7/2012 |

OTHER PUBLICATIONS

Sep. 19, 2017 International Preliminary Report on Patentability issued in International Patent Application No. PCT/JP2016/057743.
May 31, 2016 Search Report issued in International Patent Application No. PCT/JP2016/057743.
Jul. 4, 2018 Extended Search Report issued in European Patent Application No. 16764885.6.

* cited by examiner

*Primary Examiner* — Hannah J Pak
(74) *Attorney, Agent, or Firm* — Oliff PLC

(57) ABSTRACT

A nitrile rubber composition comprising a carboxyl group-containing highly saturated nitrile rubber containing α,β-ethylenically unsaturated nitrile monomer units in a ratio of 5 to 60 wt % and having an iodine value of 120 or less, a filler, and a polyamine-based cross-linking agent, wherein a content of the filler is 100 parts by weight or more and less than 200 parts by weight with respect to 100 parts by weight of the carboxyl group-containing highly saturated nitrile rubber. Accordingly a nitrile rubber composition able to give a cross-linked rubber with excellent in original state physical properties, compression set resistance, and sour gasoline resistance and small in tension set is provided.

11 Claims, No Drawings

NITRILE RUBBER COMPOSITION AND CROSS-LINKED RUBBER

TECHNICAL FIELD

The present invention relates to a nitrile rubber composition able to give a cross-linked rubber excellent in original state physical properties, compression set resistance, and sour gasoline resistance and small in tension set and to a cross-linked rubber obtained using such a nitrile rubber composition.

BACKGROUND ART

In the past, nitrile rubber (acrylonitrile-butadiene copolymer rubber) has been used as a material for rubber parts for automobile such as hoses, and tubes by making use of its oil resistance, mechanical properties, chemical resistance, etc. Further, hydrogenated nitrile rubber obtained by hydrogenating the carbon-carbon double bond in the polymer main chain of the nitrile rubber (hydrogenated acrylonitrile-butadiene copolymer rubber) is further excellent in heat resistance, so it is used for rubber such as belts, hoses, and diaphragms.

In view of such a situation, Patent Document 1 discloses a hydrogenated nitrile rubber composition comprised of 100 parts by weight of hydrogenated nitrile rubber having an acrylonitrile content of 25 to 44 wt % and an iodine value of 32 to 65 or a blend of the hydrogenated nitrile rubber, 2 to 23 parts by weight of an ester-based plasticizer, and 0.5 to 10 parts by weight of an organic peroxide. According to the hydrogenated nitrile rubber composition disclosed in Patent Document 1, a cross-linked rubber excellent in fuel oil resistance and the like can be obtained, but the sour gasoline resistance is not sufficient, the tension set is also large, and sometimes the rubber is not suited for applications where a small tension set is required, for example, seal applications.

RELATED ART

Patent Documents

Patent Document 1: International Publication No. 2007/94158

SUMMARY OF THE INVENTION

Problem to be Solved by the Invention

The present invention was made in view of such a circumstance and has as an object to provide a nitrile rubber composition able to give a cross-linked rubber excellent ion original state physical properties, compression set resistance, and sour gasoline resistance and small in tension set and a cross-linked rubber obtained by using such a nitrile rubber composition.

Means for Solving the Problem

The present inventors engaged in intensive research to achieve the above object and as a result discovered that the above object can be realized by a nitrile rubber composition comprising a carboxyl group-containing highly saturated nitrile rubber containing 5 to 60 wt % of α,β-ethylenically unsaturated nitrile monomer units and having an iodine value of 120 or less into which predetermined amounts of a filler and a polyamine-based cross-linking agent are blended and thereby completed the present invention.

That is, according to the present invention, there is provided a nitrile rubber composition comprising a carboxyl group-containing highly saturated nitrile rubber (a) containing α,β-ethylenically unsaturated nitrile monomer units in a ratio of 5 to 60 wt % and having an iodine value of 120 or less, a filler (b), and a polyamine-based cross-linking agent (c), wherein a content of the filler (b) is 100 parts by weight or more and less than 200 parts by weight with respect to 100 parts by weight of the carboxyl group-containing highly saturated nitrile rubber (a).

In the present invention, the filler is preferably a white filler, more preferably it is silica and/or a non-reinforcing white filler, still more preferably the non-reinforcing white filler is clay and/or talc.

The nitrile rubber composition of the present invention preferably comprises silica and a non-reinforcing white filler as the filler (b). The ratio of the silica and the non-reinforcing white filler preferably has a weight ratio of "silica:non-reinforcing white filler" of 1:37 to 10:9.

Further, the nitrile rubber composition of the present invention preferably further comprises a silane coupling agent.

In the present invention, the content of the filler (b) is preferably 120 to 190 parts by weight.

In the present invention, the carboxyl group-containing highly saturated nitrile rubber (a) is preferably one containing 5 to 60 wt % of α,β-ethylenically unsaturated nitrile monomer units, 1 to 30 wt % of carboxyl group-containing monomer units, 0 to 60 wt % of α,β-ethylenically unsaturated monocarboxylic acid ester monomer units, and 10 to 80 wt % of conjugated diene monomer units, more preferably the carboxyl group-containing monomer units are α,β-ethylenically unsaturated dicarboxylic acid monoester monomer units.

The nitrile rubber composition of the present invention preferably further comprises a basic cross-linking accelerator.

Further, according to the present invention, there is provided a cross-linked rubber obtained by cross-linking the above nitrile rubber composition.

Effects of Invention

According to the present invention, it is possible to provide a nitrile rubber composition able to give a cross-linked rubber excellent in original state physical properties, compression set resistance, and sour gasoline resistance and small in tension set and a cross-linked rubber obtained using such a nitrile rubber composition and excellent in original state physical properties, compression set resistance, and sour gasoline resistance and small in tension set.

DESCRIPTION OF EMBODIMENTS

The nitrile rubber composition of the present invention comprises a carboxyl group-containing highly saturated nitrile rubber (a) containing α,β-ethylenically unsaturated nitrile monomer units in a ratio of 5 to 60 wt % and having an iodine value of 120 or less, a filler (b), and a polyamine-based cross-linking agent (c) and has a content of the filler (b) of 100 parts by weight or more and less than 200 parts by weight with respect to 100 parts by weight of the carboxyl group-containing highly saturated nitrile rubber (a).

Carboxyl Group-Containing Highly Saturated Nitrile Rubber (a)

The carboxyl group-containing highly saturated nitrile rubber (a) containing α,β-ethylenically unsaturated nitrile monomer units in a ratio of 5 to 60 wt % and having an iodine value of 120 or less which is used in the present invention (below, sometimes simply referred to as the "carboxyl group-containing highly saturated nitrile rubber (a)") is a rubber which is obtained by copolymerizing an α,β-ethylenically unsaturated nitrile monomer, carboxyl group-containing monomer, and a copolymerizable other monomer which is added according to need and which has an iodine value of 120 or less.

The α,β-ethylenically unsaturated nitrile monomer is not particularly limited so long as an α,β-ethylenically unsaturated compound having a nitrile group. For example, acrylonitrile; α-halogenoacrylonitrile such as α-chloroacrylonitrile and α-bromoacrylonitrile; an α-alkylacrylonitrile such as methacrylonitrile; etc. may be mentioned. Among these as well, acrylonitrile and methacrylonitrile are preferable, while acrylonitrile is more preferable. The α,β-ethylenically unsaturated nitrile monomer may be used as single types alone or as a plurality of types combined.

The content of the α,β-ethylenically unsaturated nitrile monomer units is 5 to 60 wt % with respect to the total monomer units, preferably 10 to 50 wt %, more preferably 15 to 50 wt %. If the content of the α,β-ethylenically unsaturated nitrile monomer units is too small, the obtained cross-linked rubber becomes inferior in oil resistance, while conversely if too large, there is a possibility of the cold resistance falling.

The carboxyl group-containing monomer is not particularly limited so long as a monomer which can copolymerize with an α,β-ethylenically unsaturated nitrile monomer and has one or more unsubstituted (free) carboxyl groups which are not esterified or the like. By using a carboxyl group-containing monomer, it is possible to introduce a carboxyl group into the nitrile rubber.

As the carboxy group-containing monomer used in the present invention, for example, α,β-ethylenically unsaturated monocarboxylic acid monomer, α,β-ethylenically unsaturated polyvalent carboxylic acid monomer, α,β-ethylenically unsaturated dicarboxylic acid monoester monomer, etc. may be mentioned. Further, carboxyl group-containing monomer includes a monomer with a carboxyl group which forms a carboxylic acid salt. Furthermore, anhydride of α,β-ethylenically unsaturated polyvalent carboxylic acid also can form carboxyl groups by cleavage of an acid anhydride group after copolymerization, so can be used as a carboxyl group-containing monomer.

As the α,βethylenically unsaturated monocarboxylic acid monomer, acrylic acid, methacrylic acid, ethylacrylic acid, crotonic acid, silicic acid, etc. may be mentioned.

As the α,β-ethylenically unsaturated polyvalent carboxylic acid monomer, butenedioic acids such as fumaric acid and maleic acid, itaconic acid, citraconic acid, mesaconic acid, glutaconic acid, allylmalonic acid, teraconic acid, etc. may be mentioned. Further, as anhydrides of α,β-unsaturated polyvalent carboxylic acid, maleic anhydride, itaconic anhydride, citraconic anhydride, etc. may be mentioned.

As the α,β-ethylenically unsaturated dicarboxylic acid monoester monomers, maleic acid monoalkyl esters such as monomethyl maleate, monomethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethylcyclopentyl maleate and monoethylcyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethylcyclopentyl fumarate and monoethylcyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethylcyclopentyl citraconate and monoethylcyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethylcyclopentyl itaconate and monoethylcyclohexyl itaconate; etc. may be mentioned.

The carboxyl group-containing monomer may be used as single types alone or as a plurality of types combined. Among these as well, since the effect of the present invention becomes much more remarkable, α,β-ethylenically unsaturated dicarboxylic acid monoester monomer is preferable, of α,β-ethylenically unsaturated dicarboxylic acid monoalkyl ester monomer is more preferable, a maleic acid monoalkyl ester is still more preferable, and mono-n-butyl maleate is particularly preferable. Note that, the number of carbon atoms of the alkyl group of the alkylester is preferable 2 to 8.

The content of the carboxyl group-containing monomer units is preferably 1 to 30 wt % with respect to the total monomer units, more preferably 1 to 20 wt %, still more preferably 1 to 15 wt %. By setting the content of the α,β-ethylenically unsaturated dicarboxylic acid monoester monomer units within the above-mentioned range, it is possible to make the mechanical properties and compression set resistance of the obtained cross-linked rubber better.

In addition, the carboxyl group-containing highly saturated nitrile rubber (a) used in the present invention preferably contains conjugated diene monomer units so that the obtained cross-linked rubber has rubber elasticity.

As the conjugated diene monomer forming the conjugated diene monomer units, conjugated diene monomer having 4 to 6 carbon atoms such as 1,3-butadiene, isoprene, 2,3-dimethyl-1,3-butadiene, 1,3-pentadiene, and chloroprene is preferable, 1,3-butadiene and isoprene are more preferable, and 1,3-butadiene is particularly preferable. The conjugated diene monomers may be used as single types alone or as a plurality of types combined.

The content of the conjugated diene monomer units (including hydrogenated parts) is preferably 10 to 80 wt % with respect to the total monomer units, more preferably 25 to 75 wt %, still more preferably 40 to 70 wt %. By raking the content of the conjugated diene monomer units within the above range, it is possible to make the obtained cross-linked rubber excellent in the rubber elasticity while maintaining a good heat resistance and chemical stability.

Further, the carboxyl group-containing highly saturated nitrile rubber (a) used in the present invention nay contain, in addition to the α,β-ethylenically unsaturated nitrile monomer units, carboxyl group-containing monomer units, and conjugated diene monomer units, units of other monomers copolymerizable with the monomers forming these. As such other monomers, α,β-ethylenically unsaturated monocarboxylic acid ester monomer, ethylene, α-olefin monomer, aromatic vinyl monomer, fluorine-containing vinyl monomer, copolymerizable antiaging agent, etc. may be exemplified. Among these, from the viewpoint that it is possible to increase the sour gasoline resistance and reduce the tension set of the obtained cross-linked rubber more, an α,β-ethylenically unsaturated monocarboxylic acid ester monomer is preferred.

As the α,β-ethylenically unsaturated monocarboxylic acid ester monomer, (meth)acrylic acid ester (abbreviation for "methacrylic acid ester and acrylic acid ester", same below) having an alkyl group having 1 to 18 carbon atoms such as methyl acrylate, ethyl acrylate, n-butyl acrylate, isobutyl acrylate, n-dodecyl acrylate, methyl methacrylate, and ethyl methacrylate; (meth)acrylic acid ester having an alkoxyalkyl group having 2 to 18 carbon atoms such as methoxymethyl acrylate, methoxyethyl acrylate, ethoxypropyl acrylate, methoxybutyl acrylate, ethoxydodecyl acrylate, methoxyethyl methacrylate, methoxybutyl methacrylate, and ethoxypentyl methacrylate; (meth)acrylic acid ester having a cyanoalkyl group having 2 to 12 carbon atoms such as α-cyanoethyl acrylate, α-cyanoethyl methacrylate, and cyanobutyl methacrylate; (meth)acrylic acid ester having a hydroxyalkyl group having 1 to 12 carbon atoms such as 2-hydroxyethyl acrylate, 2-hydroxypropyl acrylate, and 2-hydroxyethyl methacrylate; (meth)acrylic acid ester having a fluoroalkyl group having 1 to 12 carbon atoms such as trifluoroethyl acrylate and tetrafluoropropyl methacrylate; etc. may be mentioned. Among these, (meth)acrylic acid ester having an alkoxyalkyl group having 2 to 18 carbon atoms is preferable, methoxyethyl acrylate and methoxyethyl methacrylate are more preferable, and methoxyethyl acrylate is particularly preferable. The content of the α,β-ethylenically unsaturated monocarboxylic acid ester monomer units is preferably 0 to 60 wt % with respect to the total monomer units, more preferably 5 to 55 wt %, and still more preferably 10 to 50 wt %.

As the α-olefin monomer, one having 3 to 12 carbon atoms is preferable. For example, propylene, 1-butene, 4-methyl-1-pentene, 1-hexene, 1-octene, etc. may be mentioned.

As the aromatic vinyl monomer, styrene, α-methylstyrene, vinylpyridine, etc. may be mentioned.

As the fluorine-containing vinyl monomer, a fluoroethylvinyl ether, fluoropropylvinyl ether, o-trifluoromethylstyrene, vinyl pentafluorobenzoate, difluoroethylene, tetrafluoroethylene, etc. way be mentioned.

As the copolymerizable antiaging agent, N-(4-anilinophenyl)acrylamide, N-(4-anilinophenyl) methacrylamide, N-(4-anilinophenyl) cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

These other copolymerizable monomers may be used as a plurality of types in combination. The content of the units of the other monomer is preferably 50 wt % or less with respect to the total monomer units constituting the carboxyl group-containing highly saturated nitrile rubber (a), more preferably 40 wt % or less, still more preferably 10 wt % or less.

The iodine value of the carboxyl group-containing highly saturated nitrile rubber (a) is 120 or less, preferably 60 or less, more preferably 40 or less, particularly preferably 30 or less. If the iodine value of the carboxyl group-containing highly saturated nitrile rubber (a) is too high, the heat resistance and the ozone resistance of the obtained cross-linked rubber are liable to decline.

The polymer Mooney viscosity $ML_{1+4}$, 100° C.) of the carboxyl group-containing highly saturated nitrile rubber is preferably 10 to 200, more preferably 15 to 150, still more preferably 15 to 100, particularly preferably 30 to 70. If the polymer Mooney viscosity of the carboxyl group-containing highly saturated nitrile rubber (a) is too low, the mechanical properties of the obtained cross-linked rubber are liable to decline. Conversely, if it is too high, the processability of the nitrile rubber composition may fall.

Further, the content of carboxyl group in the carboxyl group-containing highly saturated nitrile rubber (a), that is, the number of moles of the carboxyl group per 100 g of the carboxyl group-containing highly saturated nitrile rubber (a) is preferably $5 \times 10^{-4}$ to $5 \times 10^{-1}$ ephr, more preferably $1 \times 10^{-3}$ to $1 \times 10^{-1}$ ephr, particularly preferably $5 \times 10^{-3}$ to $6 \times 10^{-2}$ ephr. By making the content of carboxyl group of the carboxyl group-containing nitrile rubber (a) the above range, it is possible to make the obtained cross-linked rubber higher in mechanical properties and compression set resistance while making the nitrile rubber composition good in scorch stability.

The method for producing the carboxyl group-containing highly saturated nitrile rubber used in the present invention is not particularly limited, but it is possible to produce it by copolymerizing the above-mentioned monomers and, if necessary, hydrogenating the carbon-carbon double bonds in the obtained copolymer. The polymerization method is not particularly limited and a known emulsion polymerization method or solution polymerization method may be used, but the emulsion polymerization method is preferable from the viewpoint of the industrial productivity. At the time of the emulsion polymerization, in addition to the emulsifier, polymerization initiator, and molecular weight adjuster, usually used polymerization auxiliary materials can be used.

The emulsifier is not particularly limited, but, for example, a nonionic emulsifier such as a polyoxyethylene alkyl ether, polyoxyethylene alkyl phenol ether, polyoxyethylene alkyl ester, and polyoxyethylene sorbitan alkyl ester; an anionic emulsifier such as a salt of a fatty acid such as myristic acid, palmitic acid, oleic acid, and linoleic acid, an alkylbenzene sulfonic acid salt such as sodium dodecylbenzene sulfonate, a higher alcohol sulfuric acid ester salt, and an alkyl sulfosuccinic acid salt; a copolymerizable emulsifier such as a sulfo ester of an α,β-unsaturated carboxylic acid, a sulfate ester of an α,β-unsaturated carboxylic acid, and a sulfoalkylaryl ether; etc. way be mentioned. The amount of addition of the emulsifier is preferably 0.1 to 10 parts by weight with respect to 100 parts by weight of the monomer used for the polymerization, more preferably 0.5 to 5 parts by weight.

The polymerization initiator is not particularly limited so long as a radical initiator, but an inorganic peroxide such as potassium persulfate, sodium persulfate, ammonium persulfate, potassium perphosphate, and hydrogen peroxide; an organic peroxide such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; an azo compound such as azobisisobutyronitrile, azobis-2,4-dimethylvaleronitrile, azobiscyclbhexanecarbonitrile, and methylazobis isobutyrate; etc. may be mentioned. These polymerization initiators can be used alone or as two or more types combined. As the polymerization initiator, an inorganic or organic peroxide is preferable. When using a peroxide as a polymerization initiator, a reducing agent such as sodium bisulfite and ferrous sulfate may be combined with for use as a redox-type polymerization initiator. The amount of use of the polymerization initiator is preferably 0.01 to 2 parts by weight with respect to 100 parts by weight of the monomer used for the polymerization.

The molecular weight adjuster is not particularly limited, but a mercaptan such as t-dodecyl mercaptan, n-dodecyl mercaptan, and octyl mercaptan; a halogenated hydrocarbon such as carbon tetrachloride, methylene chloride, and methylene bromide; α-methylstyrene dimer; a sulfur-containing compound such as tetraethylthiuram disulfide, dipentamethylene thiuram disulfide, and diisopropylxantogen disulfide; etc. may be mentioned. These may be used alone or as two types or more combined. Among these, a mercaptan is preferable, while t-dodecyl mercaptan is more preferable. The amount of use of the molecular weight adjuster is preferably 0.02 to 1.4 parts by weight with respect to 100 parts by weight of the monomers used for emulsion polymerization, more preferably 0.1 to 1.1 parts by weight.

Further, as the molecular weight adjuster, from the viewpoint of being able to make the action and effect of the present invention more remarkable, among mercaptans, alkylthiol compound having 12 to 16 carbon atoms which have at least three tertiary or higher carbon atoms and a thiol group directly bonded with at least one tertiary carbon atom among them (below, suitably referred to as the "first alkylthiol compound") and alkylthiol compound having 9 to 16 carbon atoms other than the "first alkylthiol compound" (that is, alkylthiol compound having 9 to 16 carbon atoms where the number of tertiary or higher carbon atoms is less than 3 or alkylthiol compound having 9 to 16 carbon atoms having three or more tertiary or higher carbon atoms and not having a thiol group directly bonded to a tertiary carbon atom, below suitably referred to as a "second alkylthiol compound") are preferably jointly used. Further, regarding the amounts used at the time of joint use of these, the amount of the first alkylthiol compound is preferably 0.01 to 0.6 part by weight with respect to 100 parts by weight of the monomers used for the emulsion polymerization, more preferably 0.02 to 0.4 part by weight, while the amount of the second alkylthiol compound is preferably 0.01 to 0.8 part by weight, more preferably 0.1 to 0.7 part by weight.

For the medium of emulsion polymerization, usually water is used. The amount of the water is preferably 80 to 500 parts by weight with respect to 100 parts by weight of the total monomers which are used in the polymerization, more preferably 80 to 300 parts by weight.

At the time of the emulsion polymerization, in accordance with need, it is possible to further use a polymerization secondary material such as a stabilizer, dispersant, pH adjuster, deoxidizer, and particle size adjuster. When using these, the types and amounts are not particularly limited.

Further, in the present invention, for the obtained copolymer, in accordance with need, the copolymer can be hydrogenated (hydrogenation reaction). The hydrogenation may be performed based on a known method. The oil layer hydrogenation method of coagulating the latex of the copolymer obtained by emulsion polymerization, then hydrogenating it in an oil layer, the aqueous layer hydrogenation method of hydrogenating the latex of the obtained copolymer as it is, etc. may be mentioned.

When performing the hydrogenation by the oil layer hydrogenation method, preferably the latex of the copolymer prepared by the above emulsion polymerization is dissolved in the organic solvent after coagulation by salting out or alcohol, separation by filtration, and drying. Next, a hydrogenation reaction (oil layer hydrogenation method) is performed and the obtained hydride poured into a large amount of water to make it coagulate, then the result separated by filtration and dried to thereby obtain a carboxyl group-containing highly saturated nitrile rubber (a).

For coagulation of the latex by salting out, a known coagulant such as sodium chloride, calcium chloride, an aluminum sulfate can be used. Further, instead of coagulation by salting out, an alcohol such as methanol may be used for coagulation. The solvent for the oil layer hydrogenation method is not particularly limited so long as a liquid organic compound dissolving the copolymer obtained by emulsion polymerization, but benzene, chlorobenzene, toluene, xylene, hexane, cyclohexane, tetrahydrofuran, methylethylketone, ethyl acetate, cyclohexanone, acetone, etc. are preferably used.

As the catalyst of the oil layer hydrogenation method, any known selective hydrogenation catalyst can be used without particular limitation. A palladium-based catalyst and rhodium-based catalyst are preferable, while a palladium-based catalyst (palladium acetate, palladium chloride, palladium hydroxide, etc.) is more preferable. These may be used as two types or more combined, but in this case, it is preferable to make the palladium-based catalyst the main active ingredient. These catalysts are usually used carried on a carrier. As the carrier, silica, silica-alumina, alumina, diatomaceous earth, activated carbon, etc. may be illustrated. The amount of use of the catalyst is preferably 10 to 5000 ppm by weight with respect to the copolymer, more preferably 100 to 3000 ppm by weight.

Alternatively, when performing the hydrogenation by the aqueous layer hydrogenation method, preferably the hydrogenation reaction is performed while adding water as needed to the latex of the copolymer prepared by the above emulsion polymerization to dilute it. The aqueous layer hydrogenation method includes the aqueous layer direct hydrogenation method of supplying hydrogen to the reaction system in the presence of a hydrogenation catalyst to hydrogenate the latex and the aqueous layer indirect hydrogenation method of reducing the latex in the presence of an oxidizing agent, reducing agent, and activating agent to hydrogenate the latex. Among these, the aqueous layer direct hydrogenation method is preferable.

In the aqueous layer direct hydrogenation method, the concentration of the copolymer in the aqueous layer (concentration in latex state) is preferably 40 wt % or less to prevent coagulation. The hydrogenation catalyst is not particularly limited so long as a compound which is hard to break down in water. As specific examples, among palladium catalysts, a palladium salt of a carboxylic acid such as formic acid, propionic acid, lauric acid, succinic acid, oleic acid, and phthalic acid; chlorinated palladium such as palladium chloride, dichloro(cyclooctadiene) palladium, dichloro(norbornadiene) palladium, and ammonium hexachloropalladate (IV); an iodide such as palladium iodide; palladium sulfate-dihydrate etc. may be mentioned. Among these as well, a palladium salt of a carboxylic acid, dichloro(norbornadiene) palladium, and ammonium hexachloropalladate (IV) are particularly preferable. The amount of use of the hydrogenation catalyst may be suitably determined, but is preferably 5 to 6000 ppm by weight with respect to the copolymer obtained by polymerization, more preferably 10 to 4000 ppm by weight.

In the aqueous layer direct hydrogenation method, after the end of the hydrogenation reaction, the hydrogenation catalyst in the latex is removed. As the method, for example, the method of adding an adsorbent such as activated carbon and an ion exchange resin while stirring to make it adsorb the hydrogenation catalyst, then next filtering or separating by centrifugation the latex may be adopted. It is also possible to not remove the hydrogenation catalyst but to leave it in the latex.

Further, in the aqueous layer direct hydrogenation method, the thus obtained latex after the hydrogenation reaction is salted out to make it coagulate, separated by filtration, dried, etc. whereby a carboxyl group-containing highly saturated nitrile rubber (a) can be obtained. In this case, the steps of filtration and drying following coagulation may be performed by known methods.

Filler (b)

Further, the nitrile rubber composition of the present invention contains a filler (b) in an amount of 100 parts by weight or more and less than 200 parts by weight with respect to 100 parts by weight of the above carboxyl group-containing highly saturated nitrile rubber (a), preferably 110 to 190 parts by weight, more preferably 120 to 190 parts by weight, still more preferably 120 to 180 parts by weight, particularly preferably 120 to 170 parts by weight. According to the present invention, by including such a relatively large amount of the filler (b) with respect to the carboxyl group-containing highly saturated nitrile rubber (a), the obtained cross-linked rubber can be made one small in tension set while made excellent in original state physical properties, compression set resistance, and sour gasoline resistance. When the amount of the filler (b) is too small, the sour gasoline resistance and tension set end up deteriorating while if the amount of the filler (b) is too great, the sour gasoline resistance and tension set end up deteriorating.

The filler (b) used in the present invention is not particularly limited so long as a filler usually used in the rubber field. From the viewpoint of being able to colorize the obtained cross-linked rubber, a white filler is preferred.

The white filler is not particularly limited, but, for example, silica (white carbon) or non-reinforcing white filler is preferably used. As the silica, natural silica such as quartz powder and silicastone powder; synthetic silica such as silicic anhydride (silica gel, Aerosil, etc.), and hydrous silicic acid; etc. may be mentioned. Among these, synthetic silica is preferable from the viewpoint of a higher effect of improving the sour gasoline resistance and tension set. The specific surface area of the silica by the BET method is not particularly limited, preferably 10 to 600 $m^2/g$, more preferably 50 to 350 $m^2/g$, still more preferably 100 to 200 $m^2/g$.

Further, in the present invention, as the white filler, when using silica, in order to improve the dispersibility, it is preferable to further blend in a silane coupling agent. The silane coupling agent is not particularly limited, but as specific examples thereof, sulfur-containing silane coupling agent such as γ-mercaptopropyltrimethoxysilane, γ-mercaptomethyltrimethoxysilane, γ-mercaptomethyltriethoxysilane, γmercaptohexamethyldisilazane, bis(3-triethoxysilylpropyl)tetrasulfane, and bis(3-triethoxysilylpropyl)disulfane; epoxy group-containing silane coupling agent such as γ-glycidoxypropyltrimethoxysilane, γ-glycidoxypropylmethyldimethoxysilane, β-(3,4-epoxycyclohexyl) ethyltrimethoxysilane, γ-mercaptopropyltrimethoxysilane, and γ-glycidoxypropylmethyldiethoxysilane; amino group-containing silane coupling agent such as N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltrimethoxysilane, 3-triethoxysilyl-N-(1,3-dimethyl-butylidene) propylamine, and N-phenyl-3-aminopropyltrimethoxysilane; (meth)acryloxy group-containing silane coupling agent such as γ-methacryloxypropyltrimethoxysilane, γ-methacryloxypropyltris(β-methoxyethoxy) silane, γ-methacryloxypropylmethyldimethoxysilane, γ-methacryloxypropylmethyldiethoxysilane, γ-methacryloxypropyltriethoxysilane, γ-acryloxypropyltrimethoxysilane; vinyl group-containing silane coupling agent such as vinyltrimethoxysilane, vinyltriethoxysilane, vinyltris(β-methoxyethoxy) silane, vinyltrichlorosilane, and vinyltriacetoxysilane; chloropropyl group-containing silane coupling agent such as 3-chloropropyltrimethoxysilane; isocyanate group-containing silane coupling agent such as 3-isocyanate propyltriethoxysilane; styryl group-containing silane coupling agent such as p-styryltrimethoxysilane; ureido group-containing silane coupling agent such as 3-ureidopropyltriethoxysilane; allyl group-containing silane coupling agent such as diallyl dimethyl silane; alkoxy group-containing silane coupling agent such as tetraethoxysilane; phenyl group-containing silane coupling agent such as diphenyldimethoxysilane; fluoro group-containing silane coupling agent such as trifluoropropyl trimethoxysilane; alkyl group-containing silane coupling agent such as isobutyltrimethoxysilane and cyclohexylmethyldimethoxysilane; aluminum-based coupling agent such as acetoalkoxyaluminum diisopropylate; titanate-based coupling agent such as isopropyltriisostearoyl titanate, isopropyltris(dioctylpyrophosphate) titanate, isopropyltri (N-aminoethyl-aminoethyl) titanate, tetraoctylbis(ditridecylphosphite) titanate, tetra(2,2-diallyloxymethyl-1-butyl) bis(ditridecyl)phosphite titanate, bis(dioctypyrophosphate) oxyacetate titanate, bis(dioctylpyrophosphate) ethlyene titanate, tetraisopropylbis(dioctylphosphite) titanate, and isopropyltriisostearoyl titanate; etc. may be mentioned. These may be used as single types or a plurality of types combined. Note that when a silane coupling agent is blended in, it may be used in the form of pre-surface treatment of the surface of the silica with a silane coupling agent or may be used in the form of blending in a silane coupling agent separately independently without pre-surface treatment.

Further, the non-reinforcing white filler is not particularly limited, but calcium carbonate, magnesium carbonate, magnesium metasilicate, magnesium hydroxide, aluminum hydroxide, titanium oxide, clay, talc, Celite, etc. may be mentioned. Among non-reinforcing white fillers, from the viewpoint of a higher effect of improving sour gasoline resistance and tension set, clay and talc are preferred. The average particle size of the non-reinforcing white filler is not particularly limited, but is preferably 0.1 to 50 μm, more preferably 0.3 to 40 μm, still more preferably 0.5 to 30 μm.

The filler (b) may be used as a single type alone or as a plurality of types combined, but from the viewpoint of being able to enhance the effect of addition more, two types or more are preferably used combined. Combined use of silica and a non-reinforcing white filter is particularly preferable. When jointly using silica and a non-reinforcing white filler, the amount of these is not particularly limited, but the amount of silica is preferably made smaller than the amount of the non-reinforcing white filler. The amount of the silica with respect to 100 parts by weight of the carboxyl group-containing highly saturated nitrile rubber (a) is preferably 1 to 100 parts by weight, more preferably 5 to 80 parts by weight. Further, the amount of non-reinforcing white filler is preferably made 30 to 198 parts by weight, more preferably 70 to 180 parts by weight. Further, the mixing ratio of the silica and the non-reinforcing white filler is, by weight ratio of "silica:non-reinforcing white filler", preferably 1:37 to 10:9, more preferably 1:13 to 1:4.

Note that, in the present invention, as the filler (b), a white filler is preferably used, but if using a white filler, in addition to the white filler, a filler other than the white filler, for example, carbon black, may be jointly used. The carbon black is not particularly limited, but, for example, furnace black, acetylene black, thermal black, channel black, graphite, etc. may be mentioned.

Polyamine Cross-Linking Agent (c)

The nitrile rubber composition of the present invention contains, in addition to the above carboxyl group-containing highly saturated nitrile rubber (a) and filler (b), a polyamine-based cross-linking agent (c). By using the polyamine-based cross-linking agent (c) as a cross-linking agent, it is possible to suitably improve the compression set resistance of the obtained cross-linked rubber.

The polyamine-based cross-linking agent (c) is not particularly limited so long a compound having two or more amino groups or a compound becoming a form having two or more amino groups at the time of cross-linking, but is preferably a compound comprised of an aliphatic hydrocarbon or aromatic hydrocarbon in which a plurality of hydrogen atoms are substituted by an amino group or hydrazide structure (structure represented by —CONHNH$_2$, where CO represents a carbonyl group) and a compound becoming that form at the time of cross-linking.

As specific examples of the polyamine-based cross-linking agent (c), an aliphatic polyvalent amine such as hexamethylenediamine, hexamethylenediamine carbamate, N,N-dicinnamylidene-1,6-hexanediamine, tetramethylenepentamine, and hexamethylenediamine cinnamaldehyde adduct; an aromatic polyvalent amine such as 4,4-methylenedianiline, m-phenylenediamine, 4,4-diaminodiphenylether, 3,4-diaminodiphenylether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy)biphenyl, m-xylyenediamine, p-xylyenediamine, and 1,3,5-benzenetriamine; and a polyvalent hydrazide such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; may be mentioned. Among these as well, from the viewpoint that it is possible to make the effect of the present invention more remarkable, an aliphatic polyvalent amine and aromatic polyvalent amine are preferable, hexamethylenediamine carbamate and 2,2-bis[4-(4-aminophenoxy)phenyl]propane are more preferable, and hexamethylenediamine carbamate is particularly preferable.

In the nitrile rubber composition of the present invention, the content of the polyamine-based cross-linking agent (c) is not particularly limited, but is preferably 0.1 to 20 parts by weight with respect to 100 parts by weight of the carboxyl group-containing highly saturated nitrile rubber (a), more preferably 0.2 to 15 parts by weight, still more preferably 0.5 to 10 parts by weight. If the content of the polyamine-based cross-linking agent (c) is too small, cross-linking becomes insufficient and the mechanical properties of the obtained cross-linked rubber end up deteriorating. On the other hand, if it is too large, the mechanical properties of the obtained cross-linked-fiber end up deteriorating.

Other Compounding Agents

Further, the nitrile rubber composition of the present invention preferably further contains, in addition to the above-mentioned carboxyl group-containing highly saturated nitrile rubber (a), filler (b), and polyamine-based cross-linking agent (c), a basic cross-linking accelerator from the viewpoint of being able to make the action and effect of the invention more remarkable.

As specific examples of the basic cross-linking accelerator, a compound represented by the following general formula (1), a basic cross-linking accelerator having a cyclic amidine structure, a guanidine-based basic cross-linking accelerator, an aldehyde amine-based cross-linking accelerator, etc. may be mentioned.

$$R^1\!-\!NH\!-\!R^2 \tag{1}$$

(In the general formula (1), each of $R^1$ and $R^2$ is, respectively independently, a substituted or unsubstituted alkyl group having 1 to 12 carbon atoms or a substituted or unsubstituted cycloalkyl group having 5 to 12 carbon atoms.)

Each of $R^1$ and $R^2$ is a substituted or unsubstituted alkyl group having 1 to 12 carbon atoms or a substituted or unsubstituted cycloalkyl group having 5 to 12 carbon atoms, but a substituted or unsubstituted cycloalkyl group having 5 to 12 carbon atoms is preferable and a substituted or unsubstituted cycloalkyl group having 5 to 8 carbon atoms is particularly preferable.

Further, $R^1$ and $R^2$ preferably are not substituted.

Note that, as specific examples of the substituent in the case where each of $R^1$ and $R^2$ is substituted, a hydroxyl group, alkoxy group, alkoxycarbonyl group, amino group, halogen atom, etc. may be mentioned.

Further, among the compounds represented by the above general formula (1), from the viewpoint that it is possible to enhance the processability and scorch stability more, a compound represented by the following general formula (2) is more preferable.

$$R^3\!-\!NH\!-\!R^4 \tag{2}$$

(In the general formula (2), each of $R^3$ and $R^4$ is, respectively independently, a substituted or unsubstituted cycloalkyl group having 5 to 8 carbon atoms.)

Each of $R^3$ and $R^4$ is a substituted or unsubstituted cycloalkyl group having 5 to 8 carbon atoms, but preferably is a substituted or unsubstituted cycloalkyl group having 5 or 6 carbon atoms, more preferably is a substituted or unsubstituted cycloalkyl group having 6 carbon atoms.

Further, $R^3$ and $R^4$ preferably are not substituted.

Note that, as specific examples of a substituent in the case where each of $R^3$ and $R^4$ is substituted, a hydroxyl group, alkoxy group, alkoxycarbonyl group, amino group, halogen atom, etc. may be mentioned.

As specific examples of the compound represented by the above general formula (1), dicycloalkylamine such as dicyclopentylamine, dicyclohexylamine, and dicycloheptylamine; a secondary amine with an alkyl group and cycloalkyl group which are bonded to a nitrogen atom such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, and N-octylcyclooctylamine; a secondary amine with an alkyl group having a hydroxyl group and a cycloalkyl group which are bonded to a nitrogen atom such as N-hydroxymethylcyclopentylamine and N-hydroxybutylcyclohexylamine; a secondary amine with an alkyl group having an alkoxy group and a cycloalkyl group which are bonded to a nitrogen atom such as N-methoxyethylcyclopentylamine and N-ethoxybutylcyclohexylamine; a secondary amine with an alkyl group having an alkoxycarbonyl group and a cycloalkyl group which are bonded to a nitrogen atom such as an N-methoxycarbonylbutylcyclopentylamine and N-methoxycarbonylheptylcyclohexylamine; a secondary amine with an alkyl group having an amino group and a cycloalkyl group which are bonded to a nitrogen atom such as N-aminopropylcyclopentylamine and N-aminoheptylcyclohexylamine; a secondary amine with a cycloalkyl group having a halogen atom which are bonded to a nitrogen atom such as di(2-chlorocyclopentyl)amine and di(3-chlorocyclopentyl)amine; etc. may be mentioned. From the viewpoint that it is possible to improve more the processability and scorch stability, dicycloalkyl amine is preferable, dicyclopentylamine and dioyclohexylamine are more preferable, and dicyclohexylamine is particularly preferable.

As the basic cross-linking accelerator having a cyclic amidine structure 1,8-diazabicyclo[5, 4, 0]undecene-7 (below, sometimes abbreviated as "DBU"), 1,5-diazabicyclo[4, 3, 0]nonene-5 (below, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4 trimethylimidazole, 1, 4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl) imidazole, 1-methylbenzimidazole, 1-methyl-2-benzylbenzimidazole, 1-methyl-5-nitrolbenzimidazole, 1-methylimidazoline, 1,2-dimethylimidazoline, 1,2,4-trimethylimidazoline, 1,4-dimethyl-2-ethylimidazoline, 1-methylphenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, etc. may be mentioned. Among these basic cross-linking accelerators having cyclic amidine structure, 1,8-diazabicyclo[5,4,0]undecene-7 and 1,5-diazabicyclo[4, 3, 0]nonene-5 are preferred, and 1,8-diazabicyclo[5,4,0]undecene-7 is more preferred.

As the guanidine-based basic cross-linking accelerator, tetramethylguanidine, tetraethylguanidine, diphenylguanidine, 1,3-di-o-tolylguanidine, o-tolylbiguanide, etc. may be mentioned.

As the aldehyde amine-based basic cross-linking accelerator, n-butyraldehyde aniline, acetaldehyde ammonia, etc. may be mentioned.

Among these basic cross-linking accelerators, a compound represented by the general formula (1), a guanidine-based basic cross-linking accelerator, and a basic cross-linking accelerator having a cyclic amidine structure are preferable. A compound represented by the general formula (1) and a basic cross-linking accelerator having a cyclic amidine structure are more preferable.

Note that the compound represented by the general formula (1) may be comprised of alcohols such as alkylene glycol and alkyl alcohol having 5 to 20 carton atoms mixed together and may further contain an inorganic acid and/or organic acid. Further, the compound represented by the general formula (1) may form a salt by the compound represented by the general formula (1) and the inorganic acid and/or organic acid and further form a complex with alkylene glycol. Further, the basic cross-linking accelerator having the cyclic amidine structure may form a salt with an organic carboxylic acid or alkyl phosphoric acid etc.

In the case of blending in a basic cross-linking accelerator, the amount of the nitrile rubber composition of the present invention is preferably 0.1 to 20 parts by weight with respect to 100 parts by weight of the carboxyl group-containing highly saturated nitrile rubber (a), more preferably 0.2 to 15 parts by weight, still more preferably 0.5 to 10 parts by weight.

Further, the nitrile rubber composition of the present invention may contain, in addition to the above, compounding agents usually used in the rubber field, for example, metal oxide such as zinc oxide and magnesium oxide, $\alpha,\beta$-ethylenically unsaturated carboxylic acid metal salt such as zinc methacrylate and zinc acrylate, a co-cross-linking agent, cross-linking aid, cross-linking retarder, anti-aging agent, antioxidant, light stabilizer, scorch retarder such as a primary amine, activating agent such as diethylene glycol, silane coupling agent, plasticizer, processing aid, slip agent, adhesive, lubricant, flame retardant, antifungal agent, acid acceptor, antistatic agent, pigment, foam agent, etc. The amount of these compounding agents is not particularly limited so long within a range not detracting from the object and effect of the present invention. An amount according to the purpose of addition may be blended.

The co-cross-linking agent is not particularly limited, but is preferably a low molecular weight or high molecular weight compound having a plurality of radically reactive unsaturated groups in the molecule, for example, a polyfunctional vinyl compound such as divinylbenzene and divinyl naphthalene; isocyanurate such as triallyl isocyanurate and trimethallyl isocyanurate; cyanurate such as triallyl cyanurate; maleimide such as N,N'-m-phenylene maleimide; allyl ester of polyvalent acid such as diallyl phthalate, diallyl isophthalate, diallyl maleate, diallyl fumarate, diallyl sebacate, and diallyl phosphate; diethylene glycol bisallyl carbonate; allyl ether such as ethylene glycol diallyl ether, triallyl ether of trimethylol propane, and partial allyl ether of pentaerythritol; allyl-modified resin such as allylated novolac resin and allylated resol resin; 3 to 5-functional methacrylate compound or acrylate compound such as trimethylolpropane trimethacrylate and trimethylolpropane triacrylate; etc. may be mentioned. These may be used as single types or as a plurality of types combined.

The plasticizer is not particularly limited, but a trimellitic acid-based plasticizer, pyromellitic acid-based plasticizer, ether ester-based plasticizer, polyester-based plasticizer, phthalic acid-based plasticizer, adipic acid ester-based plasticizer, phosphoric acid ester-based plasticizer, sebacic acid ester-based plasticizer, alkylsulfonic acid ester compound plasticizer, epoxidized vegetable oil-based plasticizer, etc. can be used. As specific examples, tri-2-ethylhexyl trimellitate, trimellitic acid isonomyl ester, trimellitic acid mixed linear alkyl ester, dipentaerythritol ester, pyromellitic acid 2-ethylhexyl ester, polyether ester (molecular weight of about 300 to 5000), bis[2-(2-butoxyethoxy)ethyl]adipate, dioctyl adipate, adipic acid-based polyester (molecular weight of about 300 to 5000), dioctyl phthalate, diisononyl phthalate, dibutyl phthalate, tricresyl phosphate, dibutyl sebacate, alkylsulfonic acid phenyl ester, epoxidized soybean oil, diheptanoate, di-2-ethylhexanoate, didecanoate, etc. may be mentioned. These may be used as single types or a plurality of types together.

Furthermore, the nitrile rubber composition of the present invention may contain rubber other than the above-mentioned carboxyl group-containing highly saturated nitrile rubber (a) in a range where the effect of the present invention is not obstructed. As the rubber other than the carboxyl group-containing highly saturated nitrile rubber (a), an acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber, polyisoprene rubber, etc. may be mentioned. When mixing in rubber other than the carboxyl group-containing highly saturated nitrile rubber (a), the amount is preferably 30 parts by weight or less with respect to 100 parts by weight of the carboxyl group-containing highly saturated nitrile rubber (a), more preferably 20 parts by weight or less, still more preferably 10 parts by weight or less.

The nitrile rubber composition of the present invention is prepared by mixing the above ingredients preferably in a nonaqueous system. The method of preparation of the nitrile rubber composition of the present invention is not particularly limited, but usually it can be prepared by kneading the ingredients other than the cross-linking agent and ingredients unstable against heat (co-cross-linking agents etc.) by a mixing machine such as a Bambury mixer, internal mixer, or kneader for primary kneading, then transferring the mixture to open rolls etc. and adding the cross-linking agent and ingredients unstable against heat etc. for secondary kneading.

Cross-Linked Rubber

The cross-linked rubber of the present invention is obtained by cross-linking the nitrile rubber composition of the present invention described above.

The cross-linked rubber of the present invention can be produced by using the nitrile rubber composition of the present invention, using a forming machine which corresponds to the desired shape, for example, an extruder, injection molding machine, press, rolls, etc. for forming, heating to cause a cross-linking reaction and thereby fixnig the shape as a cross-linked product. In this case, it is possible to form the rubber, then cross-link it and possible to cross-link it simultaneously with forming. The forming temperature is usually 10 to 200° C., preferably 25 to 120° C. The cross-linking temperature is usually 100 to 200° C., preferably 130 to 190° C., While the cross-linking time is usually 1 minute to 24 hours, preferably 2 minutes to 1 hour.

Further, depending on the shape, size, etc. of the cross-linked product, sometimes, even if the surface is cross-linked, the inside part is not sufficiently cross-linked, so it is possible to further heat the rubber for secondary cross-linking.

As the heating method, a general method which is used for cross-linking rubber such as press heating, steam heating, oven heating, and hot air boating may be suitably selected.

The thus obtained cross-linked rubber of the present invention is obtained by cross-linking the above-mentioned nitrile rubber composition of the present invention and is excellent in original state physical properties, compression set resistance, and sour gasoline resistance and is small in tension set.

Therefore, the cross-linked rubber of the present invention, taking advantage of such a characteristic, can be used for various seal members such as O-rings, packings, diaphragms, oil seals, shaft seals, bearing seals, well head seals, air compressor seals, shock absorber seals, seals for sealing in Freon or fluorohydrocarbons or carbon dioxide which is used for compressors for cooling devices for air-conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, and top cover use gaskets for hard disk drives; various types of rolls such as printing use rolls, ironmaking use rolls, papermaking use tolls, industrial use rolls, and office equipment use rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuits boards or other binders, fuel cell separators and also other broad applications in the electronics field. In particular, since the cross-linked rubber of the present invention has small tension set, it can be suitably used for sealing applications, for example.

EXAMPLES

Below, examples and comparative examples will be given to specifically explain the present invention. In the following, unless otherwise stated, "parts" are based on weight. Note that the tests and evaluations were carried out as follows.

Carboxyl Group Content

To 0.2 g of 2 mm square piece of carboxyl group-containing highly saturated nitrile rubber, 100 ml of 2-butanone was added. The mixture was stirred for 16 hours, then 20 ml of ethanol and 10 ml of water ware added. While stirring, using a 0.02N hydrous ethanol solution of potassium hydroxide, titration was performed at room temperature using Thymol Phthalein as an indicator to find the number of moles of carboxyl group with respect to 100 g of rubber (units: ephr).

Composition of Carboxyl Group-Containing Highly Saturated Nitrile Rubber

The ratio of content of monomer units forming the carboxyl group-containing highly saturated nitrile rubber was measured by the following method.

That is, the ratio of content of the mono-n-butyl maleate units was calculated by finding the number of moles of carboxyl group with respect to 100 g of the carboxyl group-containing highly saturated nitrile rubber after hydrogenation by the above method of measurement of "content of carboxyl group" and converting the number of moles which was found to the amount of mono-n-butyl maleate units.

The ratio of content of 1,3-butadiene units (including hydrogenated parts) was calculated by measuring the iodine value of the carboxyl group-containing nitrile rubber before the hydrogenation reaction by the above method.

The ratio of content of the acrylonitrile units was calculated by measuring the nitrogen content in the carboxyl-containing highly saturated nitrile rubber after hydrogenation by the Kjeldahl method in accordance with JIS K6384.

The ratio of content of methoxyethyl acrylate units was calculated as the remainder of the above monomer units.

Iodine Value

The iodine value of the carboxyl group-containing highly saturated nitrile rubber was measured in accordance with JIS K 6235.

Mooney Viscosity

The Mooney viscosity of the carboxyl group-containing highly saturated nitrile rubber (polymer Mooney) was measured in accordance with JIS K6300 (unit: [$ML_{1+4}$, 100° C.]).

Original State Physical Properties (Tensile Strength, Elongation at Break, 100% Tensile Stress, Hardness)

The nitrile rubber composition was placed in a vertical 15 cm, horizontal 15 cm, depth 0.2 cm mold and pressed by a press pressure of 10 MPa while heating at 170° C. for 20 minutes to press form it and obtain a sheet-shaped primary cross-linked product. Further, the obtained primary cross-linked product was transferred to a gear oven and secondarily cross-linked at 170° C. for 4 hours, then the obtained sheet-shaped cross-linked rubber was punched by a No. 3 dumbbell type die to prepare a test piece. Further, the obtained test piece was used for measurement of the tensile strength, the elongation at break, and the 100% tensile stress of the cross-linked rubber in accordance with JIS K6251 and the hardness of the cross-linked rubber in accordance with JIS K6253 using a durometer hardness tester (type A).

Compression Set (Disk Compression Set)

Using a mold, a nitrile rubber composition was cross-linked by pressing at a temperature of 170° C. for 25 minutes to obtain diameter 29 mm, height 12.5 mm columnar primary cross-linked product. Next, the obtained primary cross-linked product was heated in a gear oven under conditions of 170° C. for 4 hours to cause secondary cross-linking and thereby obtain a columnar test piece. Further, the obtained test piece was tested in accordance with JIS K6262 by compressing the test piece by 25%, allow it to stand in a 120° C. environment for 70 hours, then measuring the compression set (disk compression set). The smaller this value, the better the compression set resistance.

Sour Gasoline Resistance Test

A sheet-shaped cross-linked rubber similar to the sheet-shaped cross-linked rubber used for the evaluation of the original state physical properties was prepared and punched by a No. 3 dumbbell shaped die to prepare a test piece. The obtained test piece was immersed in a test oil comprised of fuel oil made of isooctane and toluene mixed in a volume ratio of 1:1 to which dilauroyl peroxide was dissolved in a concentration of 5 wt %, under conditions of a temperature of 30° C. for 43 hours. Further, the test piece sample after 48 hours was subjected to a tensile test based on JIS K6251 and JIS K6253 to calculate the change rate of tensile strength after immersion, the change rate of elongation at break, and the change of hardness respectively in accordance with "change rate of tensile strength=([tensile strength after immersion-tensile strength before immersion]/tensile strength before immersion)×100", "change rate of elongation at break=([elongation at break after immersion-elongation at break before immersion]/elongation at break before immersion)×100", and "change of badness=(hardness after immersion-hardness before immersion)" to evaluate the sour gasoline resistance. The closer the absolute values of the change rate of tensile strength after immersion, the change rate of elongation at break, and the change of hardness to 0, the more it can be judged that the sour gasoline resistance is excellent.

Constant Stress Cycle Test

A sheet-shaped cross-linked rubber similar to the sheet-shaped cross-linked rubber used for the evaluation of the original state physical properties was prepared and punched by a No. 3 dumbbell shaped die to prepare a test piece. The obtained test piece was subjected to a constant stress cycle test under the following conditions using the tensile tester based on JIS K6251. The distance between the chucks was set to 50 mm, the test piece was sandwiched between the chucks, and the test piece was pulled until the load reached 0.2N so as to remove slack. Next, until the load reached 20 N, the test piece was pulled by a speed of 100 mm/min. Next, until the distance between chucks returned to 50 mm, the test piece was compressed at a speed of 100 mm/min. Next, again, the test piece was pulled at a speed of 100 mm/min until the load reached 20N, then the test piece was compressed by a speed of 100 mm/min until the distance between chucks returned to 50 mm. A constant stress cycle test was performed repeating such an expansion and contraction of test piece 50 times. Further, after the 50 times constant stress cycle test, the test piece was measured for tension set in accordance with "(distance between chucks when the load becomes 0N at time of 50th compression of test piece)−(distance between chucks right after removing slack at time of start of the test)".

Production Example 1 (Production of Carboxyl Group-Containing Highly Saturated Nitrile Rubber (a1))

To a reactor, 220 parts of ion exchanged water, 5 parts of a concentration 10% sodium dodecyl benzenesulfonate aqueous solution, 37 parts of acrylonitrile, 4 parts of mono-n-butyl maleate, and 0.75 part of t-dodecylmercaptan (molecular weight adjuster) were charged in that order, the inside gas was replaced with nitrogen three times, then 57 parts of 1,3-butadiene was charged. Further, the reactor was held at 10° C., 0.06 part of cumene hydroperoxide (polymerization initiator) and suitable amounts of a reducing agent and chelating agent were charged, and the mixture was stirred while continuing the polymerization reaction. At the time when the polymerization conversion rate reached 40% and 60%, 1 part of mono-n-butyl maleate was added respectively. At the time when the polymerization conversion rate reached 85%, 0.1 part of a concentration 10 wt % hydroquinone aqueous solution (polymerization terminator) was added to terminate the polymerization reaction. Next, the residual monomers were removed at a water temperature of 60° C. to obtain a latex of nitrile rubber (solid concentration 30 wt %).

Further, to an autoclave, the above obtained latex of nitrile rubber and a palladium catalyst (solution of 1 wt % palladium acetate acetone solution and equal weight of ion exchanged water mixed together) was added to give a content of palladium of 1000 ppm with respect to the weight of the rubber contained in the latex of nitrile rubber. A hydrogenation reaction was performed at a hydrogen pressure of 3 MPa and a temperature of 50° C. for 6 hours to obtain a latex of carboxyl group-containing highly saturated nitrile rubber (a1).

To the above obtained latex of carboxyl group-containing highly saturated nitrile rubber (a1), two times volume of methanol was added to coagulate it, then the result was vacuum dried at 60° C. for 12 hours to thereby obtain a carboxyl group-containing highly saturated nitrile rubber (a1). The obtained carboxyl group-containing highly saturated nitrile rubber (a1) had a carboxyl group content of 0.030 ephr, an iodine value of 9, and a polymer Mooney viscosity [$ML_{1+4}$, 100° C.] of 44. Further, the obtained carboxyl group-containing highly saturated nitrile rubber (a1) contained 35.7 wt % of acrylonitrile units, 58.6 wt % of butadiene units (including hydrogenated parts), and 5.7 wt % of mono-n-butyl maleate units.

Production Example 2 (Production of Carboxyl Group-Containing Highly Saturated Nitrile Rubber (a2))

To a reactor, 180 parts of ion exchanged water, 25 parts of a concentration 10% sodium dodecyl benzenesulfonate aqueous solution, 23 parts of acrylonitrile, 6.5 parts of mono-n-butyl maleate, 30.5 parts of methoxyethyl acrylate, and 0.65 part of t-dodecylmercaptan (molecular weight adjuster) were charged in that order, the inside gas was replaced with nitrogen three times, then 40 parts of 1,3-butadiene was charged. Further, the reactor was held at 10° C., 0.06 part of cumene hydroperoxide (polymerization initiator) and suitable amounts of a reducing agent and chelating agent were charged, and the mixture was stirred while continuing the polymerization reaction. At the time when the polymerization conversion rate reached 83%, 0.1 part of a concentration 10 wt % hydroquinone aqueous solution (polymerization terminator) was added to terminate the polymerization reaction. Next, the residual monomers were removed at a water temperature of 60° C. to obtain a latex of nitrile rubber (solid concentration 30 wt %).

Further, to an autoclave, the above obtained latex of nitrile rubber and a palladium catalyst (solution of 1 wt % palladium acetate acetone solution and equal weight of ion exchanged water mixed together) was added to give a content of palladium of 1000 ppm with respect to the weight of the rubber contained in the latex of nitrile rubber. A hydrogenation reaction was performed at a hydrogen pressure of 3 MPa and a temperature of 50° C. for 6 hours to obtain a latex of carboxyl group-containing highly saturated nitrile rubber (a2).

To the above obtained latex of carboxyl group-containing highly saturated nitrile rubber (a2), two times volume of methanol was added to coagulate it, than the result was vacuum dried at 60° C. for 12 hours to thereby obtain a carboxyl group-containing highly saturated nitrile rubber (a2). The obtained carboxyl group-containing highly saturated nitrile rubber (a2) had a carboxyl group content of 0.034 ephr, an iodine value of 9, and a polymer Mooney viscosity [$ML_{1+4}$, 100° C.] of 41. Further, the obtained carboxyl group-containing highly saturated nitrile rubber (a2) contained 24 wt % of acrylonitrile units, 46.6 wt % of butadiene units (including hydrogenated parts), 6.5 wt % of mono-n-butyl maleate units, and 22.9 wt % of methoxyethyl acrylate units.

Production Example 3 (Production of Carboxyl Group-Containing Highly Saturated Nitrile Rubber (a3))

To a reactor, 225 parts of ion exchanged water, 5 parts of a concentration 10% sodium dodecyl benzenesulfonate aqueous solution, 51 parts of acrylonitrile, 4 parts of mono-n-butyl maleate, and 1.05 parts of t-dodecylmercaptan (molecular weight adjuster) were charged in that order, the inside gas was replaced with nitrogen three times, then 26 parts of 1,3-butadiene was charged. Further, the reactor was held at 10° C., 0.06 part of cumene hydroperoxide (polymerization initiator) and suitable amounts of a reducing agent and chelating agent were charged, and the mixture was stirred while continuing the polymerization reaction. At the time when the polymerization conversion rate reached 60%, 19 parts of 1,3-butadiene were added, while at the time when the polymerization conversion rate reached 85%, 0.1 part of a concentration 10 wt % hydroquinone aqueous solution (polymerization terminator) was added to terminate the polymerization reaction. Next, the residual monomers were removed at a water temperature of 60° C. to obtain a latex of nitrile rubber (solid concentration 30 wt %).

Further, to an autoclave, the above obtained latex of nitrile rubber and a palladium catalyst (solution of 1 wt % palladium acetate acetone solution and equal weight of ion exchanged water mixed together) was added to give a content of palladium of 1000 ppm with respect to the weight of the rubber contained in the latex of nitrile rubber. A hydrogenation reaction was performed at a hydrogen pressure of 3 MPa. and a temperature of 50° C. for 6 hours to obtain a latex of carboxyl group-containing highly saturated nitrile rubber (a3).

To the above obtained latex of carboxyl group-containing highly saturated nitrile rubber (a3), two times volume of methanol was added to coagulate it, then the result was vacuum dried at 60° C. for 12 hours to obtain a carboxyl group-containing highly saturated nitrile rubber (a3). The obtained carboxyl group-containing highly saturated nitrile rubber (a3) had a carboxyl group content of 0.032 ephr, an iodine value of 10, and a polymer Mooney viscosity [$ML_{1+4}$, 100° C.] of 48. Further, the obtained carboxyl group-containing highly saturated nitrile rubber (a3) contained 43.4 wt % of acrylonitrile units, 50.6 wt % of butadiene units (including hydrogenated parts), and 6.0 wt % of mono-n-butyl maleate units.

Production Example 4 (Production of Carboxyl Group-Containing Highly Saturated Nitrile Rubber (a4))

To a reactor, 180 parts of ion exchanged water, 25 parts of a concentration 10 wt % sodium dodecyl benzenesulfonate aqueous solution, 20.4 parts of acrylonitrile, 5 parts of mono-n-butyl maleate, 35.2 parts of n-butyl acrylate, 0.35 part of t-dodecyl mercaptan (molecular weight adjuster (second alkylthiol compound)), and 0.03 part of 2,2,4,6,6-pentamethyl-4-heptanethiol (molecular weight adjuster (first alkylthiol compound)) were charged in that order. The inside gas was replaced with nitrogen three times, then 39.4 parts of 1,3-butadiene was charged. Next, the reaction vessel was held at 10° C., 0.1 part of cumene hydroperoxide (polymerization initiator) and suitable amounts of the reducing agent and chelating agent were charged, and the mixture was stirred while continuing the polymerization reaction. Further, at the time when the polymerization conversion rate reached 90%, 0.1 part of a concentration 10 wt % hydroquinone aqueous solution (polymerization terminator) was added to terminate the polymerization reaction. Next, a water temperature 60° C. rotary evaporator was used to remove the residual monomers and obtain a latex of nitrile rubber (solid concentration of about 30 wt %).

Further, to an autoclave, the above obtained latex of nitrile rubber and a palladium catalyst (solution of 1 wt % palladium acetate acetone solution and equal weight of ion exchanged water mixed together) was added to give a content of palladium of 2000 ppm with respect to the weight of the rubber contained in the latex of nitrile rubber. A hydrogenation reaction was performed at a hydrogen pressure of 3 MPa and a temperature of 50° C. for 6 hours to obtain a latex of carboxyl group-containing highly saturated nitrile rubber (a4).

Further, to the above obtained latex of carboxyl group-containing highly saturated nitrile rubber (a4), two times volume of methanol was added to coagulate it, then the result was filtered to take out the solids (crumbs). This was vacuum dried at 60° C. for 12 hours to thereby obtain a carboxyl group-containing highly saturated nitrile rubber (a4). The composition of the carboxyl group-containing highly saturated nitrile rubber (a4) was 20.8 wt % of acrylonitrile units, 44.2 wt % of butadiene units (including saturated parts), 4.5 wt % of mono-n-butyl maleate, and 30.5 wt % of n-butyl acrylate units. The iodine value was 10.

Production Example 5 Synthesis of Highly Saturated Nitrile Rubber a'5))

In a reactor, to 200 parts of ion exchanged water, 0.2 part of sodium carbonate was dissolved. To this, 2.25 parts of fatty acid potassium soap (potassium salt of fatty acid) was added to prepare a soap aqueous solution. Further, to this soap solution, 37 parts of acrylonitrile and 0.47 part of t-dodecyl mercaptan (molecular weight adjuster) were charged in that order. The inside gas was replaced with nitrogen three times, then 63 parts of 1,3-butadiene was charged. Next, the reaction vessel was held at 5° C., 0.1 part of cumene hydroperoxide (polymerization initiator) and suitable amounts of a reducing agent and chelating agent were charged, and the temperature was held at 5° C. while performing a polymerization reaction for 16 hours. Next, 0.1 part of a concentration 10% hydroquinone aqueous solution (polymerization terminator) was added to terminate the polymerization reaction and a water temperature 60° C. rotary evaporator was used to remove the residual monomers to obtain a latex of a nitrile rubber (solid concentration of about 25 wt %).

Next, to the above obtained latex, an aqueous solution of aluminum sulfate was added in an amount corresponding to 3 wt % of dry weight of the rubber contained in the above obtained latex and the result was stirred so as to cause it to coagulate, then this was washed with water while filtering it, then dried in vacuo at 60° C. for 12 hours to obtain a nitrile rubber. Further, the obtained nitrile rubber was dissolved in acetone to a concentration of 12 wt %. The solution was placed in an autoclave, 5000 ppm by weight of a palladium-silica catalyst was added to the nitrile rubber, then a hydrogenation reaction was performed at a hydrogen pressure of 3.0 MPa. After the end of the hydrogenation reaction, the result was poured into a large amount of water to cause it to coagulate and filtered and dried to obtain the highly saturated nitrile rubber (a'5). The composition of the obtained highly saturated nitrile rubber (a'5) was 36.2 wt % of acrylonitrile units and 63.8 wt % of butadiene units (including saturated parts), while the iodine value was 7, and the polymer Mooney viscosity [$ML_{1+4}$, 100° C.] was 65. Further, the highly saturated nitrile rubber (a'5) was measured for the carboxyl group content according to the above method, whereupon the content was the detection limit or less and substantially no carboxyl groups were contained.

Production Example 6 (Production of Highly Saturated Rubber (a'6))

To a reactor, 200 parts of ion exchanged water and 0.2 part of sodium carbonate were charged. The sodium carbonate was made to dissolve, then 2.25 parts of potassium fatty acid soap (potassium salt of fatty acid) was added to prepare a soap aqueous solution added. Further, to the obtained soap solution, 13 parts of acrylonitrile, 29 parts of n-butyl acrylate, and 0.45 part of t-dodecylmercaptan were charged in that order. The inside gas was replaced with nitrogen three times, then 21 parts of 1,3-butadiene was charged. Next, the inside of the reaction vessel was held at 5° C., 0.1 part of cumene hydroperoxide (polymerization initiator) and suitable amounts of a reducing agent and a chelating agent were charged and a polymerization reaction was initiated. Further, at the time when the polymerization conversion reached 60%, 12 parts of acrylonitrile and 25 parts of 1,3-butadiene were added. At the time when the polymerization conversion reached 85%, 0.1 part of a concentration 10% hydroquinone aqueous solution (polymerization terminator) was added to terminate the polymerization reaction, then a water temperature 60° C. rotary evaporator was used to remove the residual monomers to obtain a latex of nitrile rubber (solid concentration of about 25 wt %).

Next, to the above obtained latex, an aqueous solution of aluminum sulfate was added in an amount corresponding to 3 wt % of the rubber of the latex and the result was stirred so as to coagulate the latex, then this was washed with water while filtering it, then dried in vacuo at 60° C. for 12 hours to obtain a copolymer rubber.

Further, the obtained nitrile rubber was dissolved in acetone to a concentration of 12%. This was placed in an autoclave, 500 ppm by weight of a palladium-silica catalyst was added to the nitrile rubber, then a hydrogenation reaction was performed at a hydrogen pressure of 3.0 MPa. After the end of the hydrogenation reaction, the rubber was poured into a large amount of water to make it coagulate and was filtered and dried to obtain a highly saturated nitrile rubber (a'6). The composition of the obtained highly saturated nitrile rubber (a'6) was 25.6 wt % of acrylonitrile units, 29.4 wt % of n-butyl acrylate units, and 45 wt % of butadiene units (including saturated parts). The iodine value was 15. Further, the highly saturated nitrile rubber (a'6) was measured for carboxyl group content according to the above method, whereupon the content was the detection limit or less and substantially no carboxyl groups were contained.

Example 1

Using a Bambury mixer, to 100 parts of the carboxyl group-containing highly saturated nitrile rubber (a1) obtained in Production Example 1, 20 parts of silica (made by Nippon Aerosil, trade name "AEROSIL, (R) 972V"), 80 parts of clay (made by Burgess & Pigment, trade name "Burgess KE"), 20 parts of tri-2-ethylhexyl trimellitate (made by ADEKA Corporation, trade name "ADK Cizer C-8", plasticizer), 1.5 parts of 4,4-di-(α,α-dimethylbenzyl) diphenylamine (made by Ouchi Shinko Chemical Industrial, trade name "Nocrac CD", antiaging agent), 1 part of stearic acid, 1 part of polyoxyethylenealkyl ether phosphoric acid ester (made by Toho Chemical Industry, trade name "Phosphanol RL210", processing aid), and 0.5 part of γ-glycidoxypropyltrimethoxysilane (made by Dow Corning Toray, trade name "Z-6040 SILANE", silane coupling agent) were blended and mixed at 50° C. for 5 minutes. Next, the obtained mixture was transferred to a 50° C. roll, 4 parts of a mixture of a dicyclohexylamine salt of ethylene glycol and long chain alcohol (made by Ouchi Shinko Chemical Industrial, trade name "NOCMASTER EGS", comprised of 80 wt % of dicyclohexylamine salt of ethylene glycol and 20 wt % of long chain alcohols (1-tetradecanol, 1-hexadecanol, 1-octadecanol), basic cross-linking accelerator) and 2.1 parts of hexamethylene diamine carbamate (made by DuPont Dow Elastomer, trade name "Diak #1", polyamine cross-linking agent belonging to aliphatic polyvalent amine) were blended and kneaded to obtain a nitrile rubber composition.

Further, the above-mentioned method was used to obtain cross-linked rubber using the above prepared nitrile rubber composition. The obtained cross-linked rubber was measured for original state physical properties (tensile strength, elongation at break, 100% tensile stress, and hardness), compression set (disk compression set), sour gasoline resistance, and tension set. The results are shown in Table 1.

Examples 2 and 3

Except for changing the amount of clay from 80 parts to 130 parts (Example 2) and to 170 parts (Example 3) respectively, the same procedure was followed as in Example 1 to prepare nitrile rubber compositions and cross-linked rubbers and the same procedure was followed to evaluate them. The results are shown in Table 1.

Example 4

Except for using, instead of 100 parts of the carboxyl group-containing highly saturated nitrile rubber (a1) obtained in Production Example 1, 100 parts of the carboxyl group-containing highly saturated nitrile rubber (a2) obtained in Production Example 2 and for changing the amount of hexamethylenediamine carbamate from 2.1 parts to 2.2 parts, the same procedure was followed as in Example 1 to prepare a nitrile rubber composition and cross-linked rubber and the same procedure was followed as in Example 1 to evaluate them. The results are shown in Table 1.

Example 5

Except for using, instead of 100 parts of the carboxyl group-containing highly saturated nitrile rubber (a1) obtained in Production Example 1, 100 parts of the carboxyl group-containing highly saturated nitrile rubber (a3) obtained in Production Example 3 and for changing the amount of hexamethylenediamine carbamate from 2.1 parts to 1.8 parts, the same procedure was followed as in Example 1 to prepare a nitrile rubber composition and cross-linked rubber and the same procedure was followed as in Example 1 to evaluate them. The results are shown in Table 1.

Example 7

Except for using, instead of 100 parts of the carboxyl group-containing highly saturated nitrile rubber (a1) obtained in Production Example 1, 100 parts of the carboxyl group-containing highly saturated nitrile rubber (a4) obtained in Production Example 4 and for changing the amount of hexamethylenediamine carbamate from 2.1 parts to 1.7 parts, the same procedure was followed as in Example 1 to prepare a nitrile rubber composition and cross-linked rubber and the same procedure was followed as in Example 1 to evaluate them. The results are shown in Table 1.

Comparative Examples 1 and 2

Except for changing the amount of clay from 80 parts to 50 parts (Comparative Example 1) and to 200 parts (Comparative Example 2) respectively, the same procedure was followed as in Example 1 to prepare nitrile rubber compositions and cross-linked rumors and the same procedure was followed as in Example 1 to evaluate them. The results are shown in Table 1.

Comparative Example 3

Using a Bambury mixer, to 50 parts of the highly saturated nitrile rubber (a'5) obtained in Production Example 5 and 50 parts of the highly saturated nitrile rubber (a'6) obtained in Production Example 6, 20 parts of silica (made by Tosch Silica, trade name "Nipsil VN3"), 80 parts of clay (Takehara Kagaku Kogyo, trade name "Satintone No. 5"), 10 parts of tri-2-ethylhexyl trimellitate (made by ADEKA, trade name "ADK Cizer C-8", plasticizer), 10 parts of ether ester (made by ADEKA, trade name "ADK Cizer RS-700", plasticizer), 2 parts of vinyltris(2-methoxyethoxy) silane (made by Momentive Performance Materials Japan, trade name "A-172", silane coupling agent), 2 parts of trimethylolpropane trimethacrylate (made by Mitsubishi Rayon, trade name "ACRYESTER TMP", vulcanizing aid), 1.5 parts of 4,4'-di-(α-α-dimethylbenzyl)diphenylamine (made by Ouchi Shinko Chemical Industrial, trade name "NORAC CD", antiaging agent), 1.5 parts of 2-mercaptobenzimidazole zinc salt (made by Ouchi Shinko Chemical Industrial, antiaging agent, Nocrac MBZ), and 1 part of stearic acid were blended and mixed at 50° C. for 5 minutes. Next, the obtained mixture was transferred to a 50° C. roll and 12 parts of 1,3-bis(t-butylperoxyisopropyl)benzene (organic peroxide) 40% product; (made by Hercules, Vul-Cup40KE) was mixed in and kneaded to obtain a nitrile rubber composition.

Further, using the obtained cross-linkable rubber composition, except for changing the conditions of the secondary cross-linking to 150° C. for 4 hours, the same procedure was followed as in Example 1 to obtain cross-linked rubber and the same procedure was followed as in Example 1 to evaluate it. The results are shown in Table 1.

Table 1

TABLE 1

|  |  | Example | | | | | | Comparative Example | | |
|---|---|---|---|---|---|---|---|---|---|---|
|  |  | 1 | 2 | 3 | 4 | 5 | 6 | 1 | 2 | 3 |
| Composition of nitrile rubber composition | | | | | | | | | | |
| Carboxyl group-containing nitrile rubber (a1) | (Part) | 100 | 100 | 100 |  |  |  | 100 | 100 |  |
| Carboxyl group-containing nitrile rubber (a2) | (Part) |  |  |  | 100 |  |  |  |  |  |
| Carboxyl group-containing nitrile rubber (a3) | (Part) |  |  |  |  | 100 |  |  |  |  |
| Carboxyl group-containing nitrile rubber (a4) | (Part) |  |  |  |  |  | 100 |  |  |  |

TABLE 1-continued

|  |  | Example |  |  |  |  |  | Comparative Example |  |  |
|---|---|---|---|---|---|---|---|---|---|---|
|  |  | 1 | 2 | 3 | 4 | 5 | 6 | 1 | 2 | 3 |
| Highly saturated nitrile rubber (a'5) | (Part) |  |  |  |  |  |  |  |  | 50 |
| Highly saturated nitrile rubber (a'6) | (Part) |  |  |  |  |  |  |  |  | 50 |
| Silica (AEROSIL R972V) | (Part) | 20 | 20 | 20 | 20 | 20 | 20 | 20 | 20 |  |
| Silica (Nipsil VN3) | (Part) |  |  |  |  |  |  |  |  | 20 |
| Clay (Burgess KE) | (Part) | 80 | 130 | 170 | 80 | 80 | 80 | 50 | 200 |  |
| Clay (Satintone No. 5) | (Part) |  |  |  |  |  |  |  |  | 80 |
| Tri-2-ethylhexyl trimellitate | (Part) | 20 | 20 | 20 | 20 | 20 | 20 | 20 | 20 | 10 |
| Ether ester | (Part) |  |  |  |  |  |  |  |  | 10 |
| 4,4'-di-(α,α-dimethylbenzyl)diphenylamine | (Part) | 1.5 | 1.5 | 1.5 | 1.5 | 1.5 | 1.5 | 1.5 | 1.5 | 1.5 |
| 2-mercaptobenzimidazole zinc salt | (Part) |  |  |  |  |  |  |  |  | 1.5 |
| Stearic acid | (Part) | 1 | 1 | 1 | 1 | 1 | 1 | 1 | 1 | 1 |
| Polyoxyethylenealkyl ether phosphoric acid ester | (Part) | 1 | 1 | 1 | 1 | 1 | 1 | 1 | 1 |  |
| γ-glycidoxypropyltrimethoxysilane | (Part) | 0.5 | 0.5 | 0.5 | 0.5 | 0.5 | 0.5 | 0.5 | 0.5 |  |
| Vinyltris(2-methoxyethoxy)silane | (Part) |  |  |  |  |  |  |  |  | 2 |
| Trimethylolpropane trimethacrylate | (Part) |  |  |  |  |  |  |  |  | 2 |
| Dicyclohexylamine salt of ethylene glycol (80 wt %) | (Part) | 4 | 4 | 4 | 4 | 4 | 4 | 4 | 4 |  |
| Hexamethylene diamine carbamate | (Part) | 2.1 | 2.1 | 2.1 | 2.2 | 1.8 | 1.7 | 2.1 | 2.1 |  |
| 1,3-bis(t-butylperoxyisopropyl)benzene (40% product) | (Part) |  |  |  |  |  |  |  |  | 12 |
| Original state physical properties |  |  |  |  |  |  |  |  |  |  |
| Tensile strength | (MPa) | 17.5 | 19.3 | 21.4 | 16.0 | 18.7 | 20.0 | 16.2 | 22.1 | 19.4 |
| Elongation at break | (%) | 240 | 210 | 190 | 220 | 300 | 240 | 260 | 160 | 250 |
| 100% tensile stress | (MPa) | 8.43 | 9.37 | 12.1 | 10.4 | 5.96 | 5.03 | 5.97 | 17.8 | 7.40 |
| Hardness (Duro A) |  | 72 | 84 | 94 | 70 | 69 | 68 | 67 | 98 | 69 |
| Compression set resistance |  |  |  |  |  |  |  |  |  |  |
| Compression set (disk shape) | (%) | 6 | 10 | 12 | 9 | 11 | 10 | 5 | 13 | 21 |
| Sour gasoline resistance |  |  |  |  |  |  |  |  |  |  |
| Tensile strength (after test oil immersion) | (MPa) | 8.99 | 10.1 | 10.9 | 7.61 | 11.2 | 8.4 | 7.58 | 11.0 | 8.92 |
| Change rate of tensile strength | (%) | −49 | −48 | −49 | −52 | −40 | −58 | −53 | −50 | −54 |
| Elongation at break (after test oil immersion) | (%) | 120 | 110 | 90 | 90 | 170 | 90 | 110 | 70 | 110 |
| Change rate of elongation at break | (%) | −50 | −48 | −53 | −59 | −43 | −63 | −58 | −56 | −56 |
| Hardness (after test oil immersion) (Duro A) |  | 62 | 76 | 89 | 63 | 67 | 60 | 52 | 94 | 53 |
| change of hardness | (pts) | −6 | −5 | −4 | −7 | −2 | −8 | −9 | −4 | −16 |
| Constant stress cycle test |  |  |  |  |  |  |  |  |  |  |
| Tension set | (mm) | 0.81 | 0.75 | 0.69 | 0.91 | 0.74 | 0.83 | 1.2 | 1.1 | 3.1 |

From Table 1, the cross-linked rubber obtained by using a nitrile rubber composition containing 100 parts of the carboxyl group-containing highly saturated nitrile rubber (a) which contains α,β-ethylenically unsaturated nitrile monomer units in a ratio of 5 to 60 wt % and has an iodine value of 120 or less, 100 parts or more and less than 200 parts of a filler (b), and a polyamine-based cross-linking agent (c) is excellent in original state physical properties, compression set resistance, and sour gasoline resistance, and particularly is small in tension set in a constant stress cycle test, this is a good result (Examples 1 to 6).

On the other hand, when the amount of the filler (b) was made 70 parts, the obtained cross-linked rubber is inferior in resistance in sour gasoline and is large in tension set in the constant stress cycle test (Comparative Example 1).

Further, when the amount of the filler (b) was made 220 parts, the obtained cross-linked rubber is inferior in sour gasoline resistance and is large in tension set in the constant stress cycle test (Comparative Example 2).

Furthermore, when using, instead of the carboxyl group-containing highly saturated nitrile rubber (a), the highly saturated nitrile rubber (a'5) and highly saturated nitrile rubber (a'6), the rubber is inferior in sour gasoline resistance (in particular, change of hardness) and is large in tension set in the constant stress cycle test (Comparative Example 3).

The invention claimed is:

1. A nitrile rubber composition comprising a carboxyl group-containing nitrile rubber (a) comprising α,β-ethylenically unsaturated nitrile monomer units in a ratio of 5 to 60 wt % and having an iodine value of 120 or less, a filler (b), and a polyamine-based cross-linking agent (c), wherein a content of the filler (b) is 100 parts by weight or more and less than 200 parts by weight with respect to 100 parts by weight of the carboxyl group-containing nitrile rubber (a), the nitrile rubber composition comprises silica and a non-reinforcing white filler as the filler (b), and a ratio of the silica and the non-reinforcing white filler is, by weight ratio of silica:non-reinforcing white filler, 1:37 to 10:9.

2. The nitrile rubber composition according to claim 1, wherein the non-reinforcing white filler is clay and/or talc.

3. The nitrile rubber composition according to claim 1, further comprising a silane coupling agent.

4. The nitrile rubber composition according to claim 1, wherein the content of the filler (b) is 120 to 190 parts by weight with respect to 100 parts by weight of the carboxyl group-containing nitrile rubber (a).

5. The nitrile rubber composition according to claim 1, wherein the carboxyl group-containing nitrile rubber (a) comprises 5 to 60 wt % of α,β-ethylenically unsaturated nitrile monomer units, and further comprises 1 to 30 wt % of carboxyl group-containing monomer units, 0 to 60 wt % of α,β-ethylenically unsaturated monocarboxylic acid ester monomer units, and 10 to 80 wt % of conjugated diene monomer units.

6. The nitrile rubber composition according to claim 5, wherein the carboxyl group-containing monomer units are α,β-ethylenically unsaturated dicarboxylic acid monoester monomer units.

7. The nitrile rubber composition according to claim 1, further comprising a basic cross-linking accelerator.

8. A cross-linked rubber obtained by cross-linking the nitrile rubber composition according to claim 1.

9. The nitrile rubber composition according to claim 1, wherein the ratio of the silica and the non-reinforcing white filler is, by weight ratio of silica:non-reinforcing white filler, 1:13 to 1:4.

10. The nitrile rubber composition according to claim 1, wherein the content of the filler (b) is 110 to 190 parts by weight with respect to 100 parts by weight of the carboxyl group-containing nitrile rubber (a).

11. The nitrile rubber composition according to claim 1, wherein a content of the silica is 1 to 100 parts by weight and a content of the non-reinforcing white filler is 30 to 198 parts by weight with respect to 100 parts by weight of the carboxyl group-containing nitrile rubber (a).

* * * * *